United States Patent [19]

Sheehan, Jr.

[11] Patent Number: 4,741,935
[45] Date of Patent: May 3, 1988

[54] ADHESIVE TAPE CLOSURE

[75] Inventor: Richard L. Sheehan, Jr., Stillwater, Minn.

[73] Assignee: Minnesota Mining & Manufacturing Company, St. Paul, Minn.

[21] Appl. No.: 41,867

[22] Filed: Apr. 23, 1987

[51] Int. Cl.⁴ ............................................. A61F 13/02
[52] U.S. Cl. ...................................... 428/35; 428/40; 428/57; 428/58; 428/61
[58] Field of Search ...................... 428/35, 40, 57, 58, 428/61

[56] References Cited

U.S. PATENT DOCUMENTS

| | | | |
|---|---|---|---|
| 3,329,331 | 7/1967 | Morgan | 229/51 |
| 3,616,114 | 10/1971 | Hamaguchi | 161/39 |
| 3,873,018 | 3/1975 | Donnay | 229/51 |
| 4,041,202 | 8/1977 | Williams | 428/328 |
| 4,351,877 | 9/1982 | Williams | 428/350 |

Primary Examiner—Marion C. McCamish
Attorney, Agent, or Firm—Donald M. Sell; James A. Smith; LeLand D. Schultz

[57] ABSTRACT

An adhesive tape closure for releasably interconnecting container parts including partially overlapping adhesively coated first and second lower tape strips, each for mounting on a container part. An upper tape strip is releasably applied to the lower tape strips and is at least coextensive with the overlapped portion of the lower tape strips. The adhesive tape closure may be disengaged by delaminating the upper tape strip from the first and second lower tape strips and manually separating the lower tape strips from each other to disconnect the container parts.

12 Claims, 3 Drawing Sheets

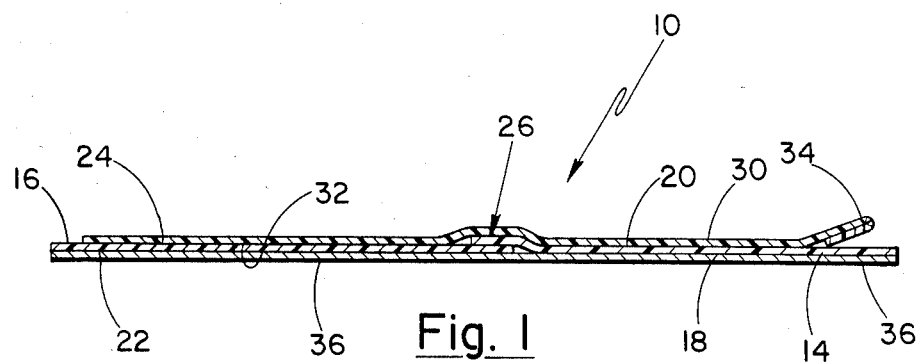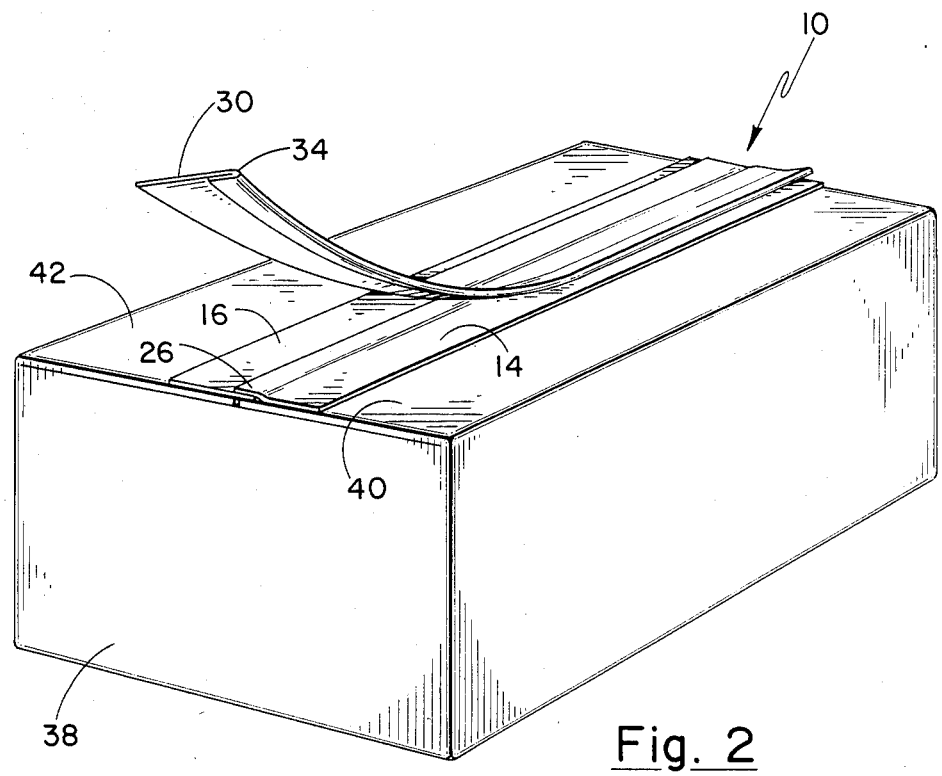

4,741,935

ADHESIVE TAPE CLOSURE

FIELD OF THE INVENTION

This invention relates generally to adhesive tapes and more particularly to adhesive tape closures for forming, sealing and interconnecting container parts.

BACKGROUND OF THE INVENTION

Adhesive tapes have been in wide use in the past as closures for interconnecting container parts. For the purposes of this application, the term "container part" includes all containers such as boxes, cartons or the like and any portion thereof, such as joints, lids, closure flaps, and the interconnecting of one container to another container. Such containers are typically constructed from a rigid, lightweight material having high strength, such as corrugated fiberboard, paperboard or the like.

It is frequently desirable to open, disconnect or dismantle a container part. For instance, a container may be opened, emptied and then "knocked down" for storage and subsequent reassembly and reuse. With conventional adhesive tape closures, it is necessary to use a knife or the like to sever the tape closure and disconnect the container parts. This is costly, time consuming, and may damage the contents of the container. Alternatively, the adhesive tape closure may be torn or pulled from the container parts, tending to damage or destroy the container and render it unsuitable for reuse.

U.S. Pat. No. 4,041,202, issued to Williams and entitled "Strippable Tape" represents one attempt to overcome these limitations. In the Williams patent, an upper tape layer is provided having a relatively high internal bond strength that is releasably adhered to a lower tape layer having a relatively low internal bond strength. A medial slit divides the lower tape layer into two adjacent abutting segments. The laminated tape is applied to container parts to adhesively interconnect them. To disconnect the container parts, the upper tape layer is delaminated and the lower tape layer separated at the medial slit.

However, the Williams patent still exhibits several undesirable limitations. It is laborious to engage and peel away a corner or edge of the upper tape layer to delaminate it from the lower tape layer. This results in unnecessary delay and difficulty in disconnecting the container parts.

Further, as the upper tape layer is delaminated from the lower tape layer, the lower tape layer has a tendency to adhere to the upper tape layer and delaminate from the container part, particularly along the medial slit, with the undesirable affects previously discussed.

SUMMARY OF THE INVENTION

This invention provides an adhesive tape closure having first and second lower tape strips each including an adhesive coating. The first and second lower tape strips are partially overlapping along adjacent edges. An upper tape strip is releasably adhered to the first and second lower tape strips and is at least coextensive with the overlapped portion of the lower tape strips. Each of the lower tape strips is adhesively secured to one of two adjacent container parts with the overlapped portion generally positioned at the juncture of the container parts.

To disconnect the container parts, the upper tape strip is delaminated, preferably by grasping a tab projecting from an edge of the upper tape strip. The overlapped portion precludes delamination of the lower tape strips from the container parts as the upper tape strip is removed. The lower tape strips are then easily manually separated from each other at the overlapped portion to disconnect the container parts.

BRIEF DESCRIPTION OF THE DRAWINGS

In the drawings:

FIG. 1 is a cross-sectional view of an adhesive tape closure according to this invention.

FIG. 2 is an isometric view of the adhesive tape closure of FIG. 1 applied to a container, with the upper tape strip partially delaminated.

DETAILED DESCRIPTION OF THE INVENTION

Figure 3A:
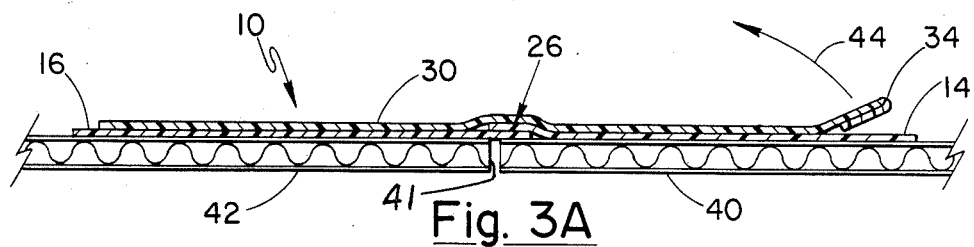
FIG. 3A is a cross-sectional view in detail of the adhesive tape closure of FIG. 2 applied to container parts.

Referring now to FIG. 1, the reference numeral 10 generally indicates an adhesive tape closure constructed according to this invention. It is to be understood that the dimensions of the adhesive tape closure of this invention have been exaggerated in the drawings as required for purposes of clarity. The tape closure 10 includes a first lower tape strip 14 and a second lower tape strip 16. First lower tape strip 14 has first and second opposed major surfaces 18 and 20. Second lower tape strip 16 likewise has first and second opposed major surfaces 22 and 24. An adhesive coating is applied to each first major face 18 and 22 of the lower tape strips. Although any suitable adhesive, such as a water soluble adhesive, may be used, preferably a pressure sensitive adhesive is utilized.

The lower tape strips 14 and 16 are positioned such that their adjacent edges are overlapped, as at 26. For the purposes of this application, the term "overlapped" means that a portion of the first major surface 18 of lower tape strip 14 is placed in contact with a portion of the second major surface 24 of lower tape strip 16. In this arrangement, the lower tape strips are releasably secured together by the adhesive coating on lower tape strip 14. However, it is to be understood that the reciprocal bond between the lower tape strips is limited so that the lower tape strips may be easily manually separated from each other when desired, as will be explained in greater detail hereinafter.

Upper tape strip or strip 30 is releasably secured to the second major faces 20 and 24 of the lower tape strips by an adhesive coating on its first major surface 32. Preferably, the adhesive coating is a pressure sensitive adhesive having a bond strength to the second major surfaces 20 and 24 of the lower tape strips no greater than the bond strength of the adhesive coating on first major surfaces 18 and 22 of the lower tape strips to their respective container parts. Alternatively, the second major faces 20 and 24 of the lower tape strips 14 and 16 may be treated with a release agent, as is known in the art, to selectively control the level of force required to delaminate the upper tape strip from the lower tape strips. The upper tape strip 30 is at least coextensive with the overlapped portion 26 of the lower tape strips so as to secure the lower tape strips to each other.

In one example, the lower tape strips are constructed of Highland ® Brand utility box sealing tape #371 manufactured by Minnesota Mining and Manufacturing Company of St. Paul, Minn. This tape includes a backing constructed of "Scotchpro" TM Brand polypropylene film having a 0.030 mm (0.0012") thickness. A pressure-sensitive rubber resin adhesive is used having a thickness of 0.020 mm (0.0008") and an adhesion strength to steel of 44 N/100 mm width (40 oz/in. width) (ASTM D-3330). The upper tape strip is constructed of Scotch ® Brand general purpose box sealing tape #373 also manufactured by Minnesota Mining and Manufacturing Company of St. Paul, Minn. This tape includes a "Scotchpro" TM Brand polypropylene film backing having a thickness of 0.0016" and includes a pressure-sensitive rubber-resin adhesive having a thickness of 0.025 mm (0.001") and an adhesion strength to steel of 55 N/100 mm width (50 oz/in. width) (ASTM D-3330).

The upper tape strip 30 also includes a tab 34 projecting from one edge to facilitate manual engagement of the upper tape strip, as will be explained hereinafter. In the illustrated embodiment, the tab 34 is formed along the full length of the upper tape strip by reversing and folding under an edge so that portions of first major surface 32 are placed in reciprocal contact and secured together by the adhesive coating thereon. The tab thus formed projects along an edge of the upper tape strip 30 without adhering to the lower tape strip 14. This represents a significant advantage over conventional tape closure designs. Although the location, size and shape of the tab may be varied, a tab of between 0.32 cm–0.95 cm ($\frac{1}{8}$"–$\frac{3}{8}$") in width extending the full length of the upper tape strip has been found convenient. Of course, other alternative tab constructions may be employed, including separate adhesive tab strips secured to the upper tape strip, or providing a portion of first major surface 32 of the upper tape strip without an adhesive coating.

Liner 36 is applied to the first major surfaces 18 and 22 of the lower tape strips 14 and 16, respectively, to cover the adhesive coating thereon. This enables the adhesive tape closure to be pre-constructed and stored, such as in roll form. The lower tape strip may be formed by medially dividing a tape strip or by providing two separately formed tape strips. A desired length of the laminated tape may be cut off from a roll to form a tape closure and the liner delaminated during use of the tape closure, as hereinafter described. Alternatively, the tape closure may be constructed and applied directly to container parts, in which case the liner may be omitted. In addition, separate liners (not shown) may be used for each of the lower tape strips 14 and 16.

The upper and lower tape strips may be constructed of material that is transparent, translucent, opaque and colored, or any combination thereof. In addition, any of the upper or lower tape strips may include indicia such as instructions for use of the tape closure or advertising, if desired.

In operation, the adhesive tape closure 10 is adhesively applied to container parts, such as the hinged closure flaps 40 and 42 of container 38 shown in FIG. 2 and represented in greater detail in FIG. 3A. If provided, a liner (not shown) has been previously delaminated and discarded. The lower tape strip 14 has been adhesively applied to closure flap 40 and lower tape strip 16 has been adhesively applied to closure flap 42, with the overlapped portion 26 positioned generally at the juncture of the closure flaps. In many applications it is desirable that the lower tape strip 16 extends to at least edge 41 of closure flap 42 to prevent any portion of lower tape strip 14 from adhering to an exposed surface of closure flap 42. In this manner, the container may be handled, transported and stored while securely sealed.

Figure 3B:
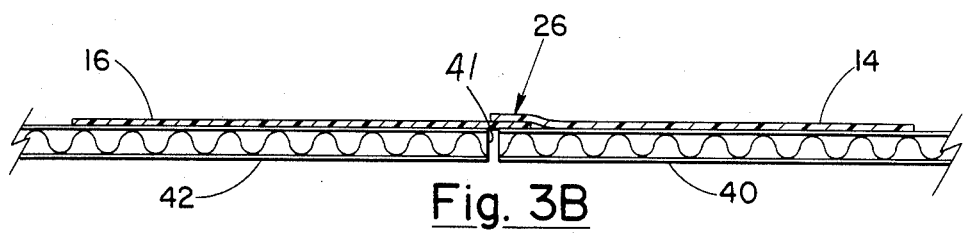
FIG. 3B is a cross-sectional view of the adhesive tape closure of FIG. 3A with the upper tape strip removed.

If it is desired to disconnect the closure flaps 40 and 42, the upper tape strip 30 is delaminated by grasping the tab 34 and pulling away from the lower tape strips, leaving the lower tape strips still securely mounted on the closuue flaps, as shown in FIG. 3B and temporarily joined together in the overlapped portion 26. By forming the tab 34 on the edge of the upper tape strip overlying segment 14 of the lower tape strip, the force of delamination will be directed principally in direction 44 (as shown in FIG. 3A) across the tape closure. The construction of the overlapped portion 26 thus prevents delamination of either lower tape strips 14 or 16 from their respective closure flaps. This represents an additional significant improvement over conventional tape closures.

Figure 3C:
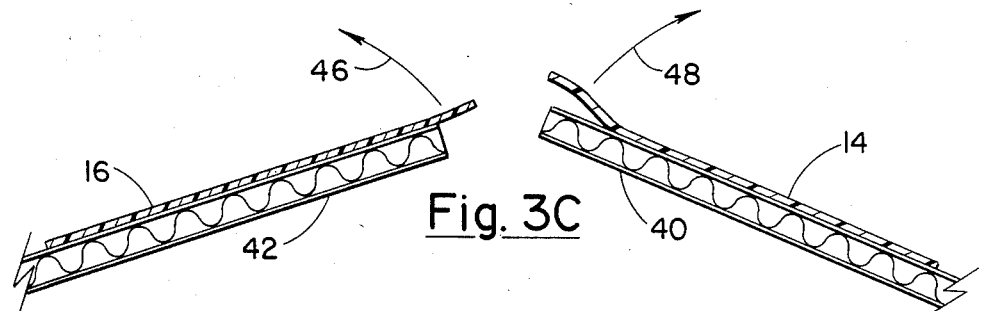
FIG. 3C is a cross-sectional view of the adhesive tape closure of FIG. 3B with the lower tape strips separated and the container parts disconnected.

The lower tape strips 14 and 16 may be easily and quickly manually separated at the overlapped portion 26 and the closure flaps disconnected, as shown in FIG. 3C. The amount of overlap between the lower tape strips may be varied according to the strength of the adhesives used, the material of the lower tape strips, the type of controlled release coating applied, and the length, width and thickness of the lower tape strips, among other factors, so that each of the lower tape strips are more securely adhered to their respective container parts then to each other at the overlapped portion and the overlapped portion may be dissambled by applying manual force to the lower tape strips. For instance, the lower tape strips may be separated by forcing closure flaps 40 and 42 in opposing rotative directions 46 and 48, respectively, as shown in FIG. 3C. It has been found convenient in many applications to have an overlap of between 0.16 cm–0.63 cm (1/16"–$\frac{1}{4}$"). Since the lower tape strips are not delaminated from the container parts as the container parts are disconnected, the container is not damaged or defaced and may be reused by applying a new tape closure at the same location, or elsewhere on the container, if desired.

Figure 4:
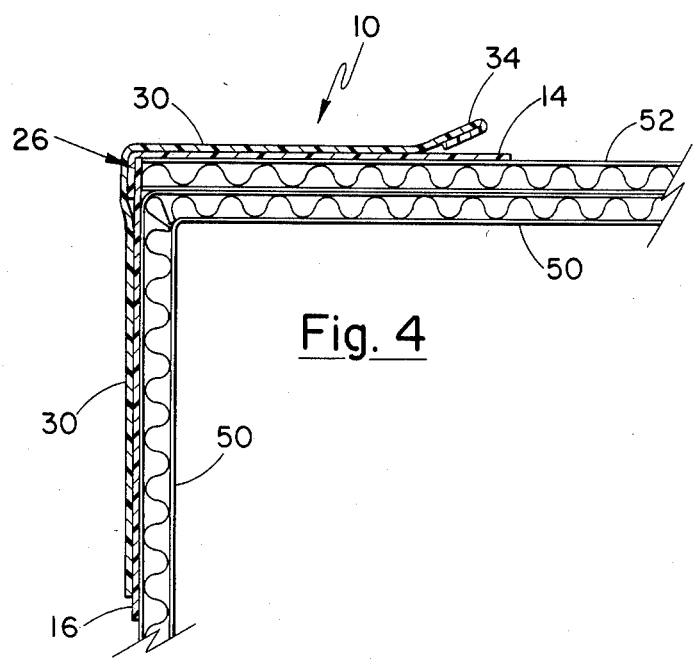
FIG. 4 is a cross-sectional view of the adhesive tape closure of FIG. 1 applied to a container having a hinged lid.

FIG. 4 shows an alternative application for the adhesive tape closure of this invention with lower tape strip 16 applied to body 50 of a container having a hinged lid 52 to which lower tape strip 14 is applied. The tape closure thus exhibits an intermediate 90° bend at approximately the position of the overlapped portion 26. Although not specifically illustrated in the drawings, the tape closure of this invention is equally applicable in a manner similar to that shown in FIG. 4 to other container configurations, including those with partially or fully overlapped closure flaps.

Figure 5:
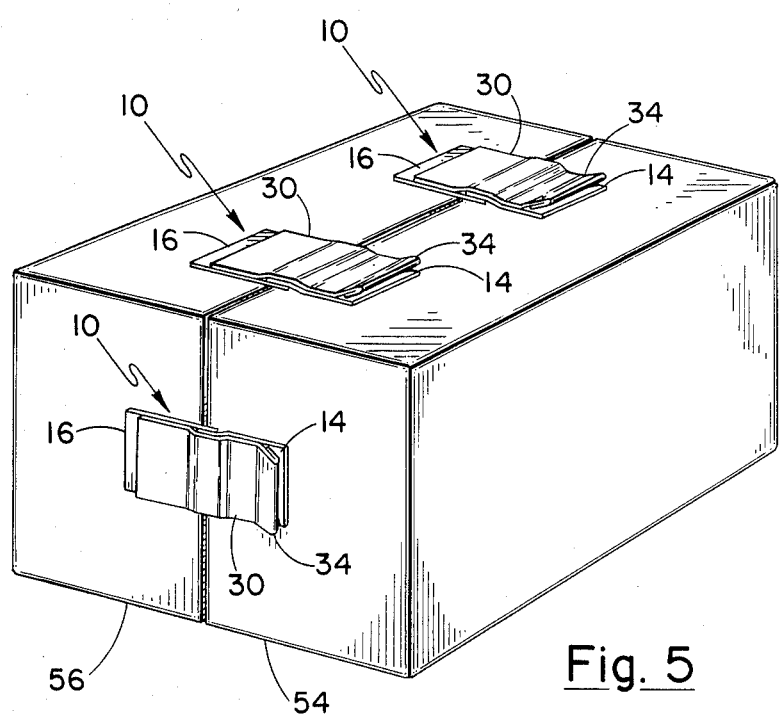
FIG. 5 is an isometric view of the adhesive tape closure of FIG. 1 interconnecting two adjacent containers.

FIG. 5 shows yet another alternative application for the tape closure of this invention in which one or more tape closures 10 are applied to two adjacent containers 54 and 56 to interconnect the containers. Disconnection of the tape closures shown in FIGS. 4 and 5 is otherwise as herein described.

What is claimed is:

1. An adhesive tape closure for releasably interconnecting a first container part to a second container part, comprising:
   (a) a first lower tape strip having an adhesive film coated on one side for mounting on the first container part;
   (b) a second lower tape strip having an adhesive film coated on one side for mounting on the second container part, with a portion of said first lower tape strip overlapping a portion of said second lower tape strip so as to adhesively secure said second lower tape strip to said first lower tape strip at said overlapped portion while enabling said first and second lower tape strips to be manually separated; and
   (c) an upper tape strip coated on one side with a pressure-sensitive adhesive releasably securing said upper tape strip to said first and said second lower tape strips opposite said adhesive films and coextensive with said overlapped portion for securely interconnecting the container parts through said first and said second lower tape strips when said first and said second lower tape strips are mounted thereon, wherein said upper tape strip may be removed from said first and said second lower tape strips, thereby enabling said first and said second lower tape strips to be manually separated from each other and the container parts to be disconnected.

2. The adhesive tape closure of claim 1, further including at least one liner detachably applied to said adhesive films of said first and said second lower tape strips.

3. The adhesive tape closure of claim 1, wherein said upper tape member further includes a tab projecting from an edge thereof for facilitating removal of said upper tape strip from said first and said second lower tape strips.

4. The adhesive tape closure of claim 3, wherein said tab overlays said first lower tape strip.

5. An adhesive tape closure for interconnecting a first container part to a second container part, comprising:
   (a) a first lower adhesive tape strip for mounting on a first major surface to the first container part;
   (b) a second lower adhesive tape strip for mounting on a first major surface to the second container part;
   (c) a portion of said first lower tape strip overlaps a portion of said second lower tape strip so as to adhesively secure said second lower tape strip to said first lower tape strip at said overlapped portion while enabling said first and second lower tape strips to be manually separated;
   (d) an upper adhesive tape strip releasably applied to a second major surface of each of said first and said second tape strips opposite said first major surfaces and coextensive with said overlapped portion of said first and said second lower tape strips so as to securely interconnect the container parts together through said first and said second lower tape strips when applied thereto; and
   (e) a tab projecting from an edge of said upper tape strip for facilitating removal of said upper tape strip from said first and said second lower tape strips enabling said first and said second lower tape strips to be manually separated from each other and the container parts to be disconnected.

6. The adhesive tape closure of claim 5, in which said tab is formed by at least a portion of said edge of said upper tape strip being reversed and the adhesive side folded onto itself.

7. The adhesive tape closure of claim 5, wherein said tab of said upper tape strip is located over said first lower tape strip and spaced from said overlapped portion of said first and said second lower tape strips.

8. The adhesive tape closure of claim 5, further comprising indicia on at least one of said first and said second lower tape strips and said upper tape strip.

9. The adhesive tape closure of claim 5, wherein between 1/16" and ¼" of said first lower tape strip overlaps said lower second tape strip.

10. The adhesive tape closure of claim 5, wherein said tab is between ⅛"-⅜" in width.

11. In combination;
   (a) a first container part;
   (b) a second container part located adjacent said first container part; and
   (c) a tape closure, including
      a first lower adhesive tape strip mounted on said first container part,
      a second lower adhesive tape strip mounted on said second container part,
      wherein said first and said second lower tape strips partially overlap generally at the juncture of said first and said second container parts so as to adhesively secure said second lower tape strip to said first lower tape strip at said overlapped portion while enabling said first and second lower tape strips to be manually separated,
      an upper adhesive tape strip releasably applied to said first and said second lower tape strips opposite said container parts and coextensive with said overlapped portion thereof so as to secure said first and said second lower tape strips to each other and to interconnect said container parts together and whereby said container parts may be disconnected by removing said upper tape strip and manually separating said first and second lower tape strips from each other, and
      a tab projecting from an edge of said upper tape strip for facilitating removal of said upper tape strip from said first and said second lower tape strips enabling said first and said second lower tape strips to be manually separated from each other and said container parts to be disconnected.

12. The combination of claim 11, wherein said upper tape strip of said tape closure further includes a tab protecting from an edge thereof spaced from said overlapping portion of said first and said second lower tape strips facilitating manual engagement and removal of said upper tape strip from said first and said second lower tape strips.

* * * * *